United States Patent Office 3,564,021
Patented Feb. 16, 1971

3,564,021
PREPARATION OF CYCLIC OR ACYCLIC ETHERS
Paul R. Stapp, Bartlesville, Okla., assignor to Phillips Petroleum Company, a corporation of Delaware
No Drawing. Continuation-in-part of abandoned application Ser. No. 682,970, Nov. 14, 1967, which is a continuation-in-part of abandoned application Ser. No. 602,553, Dec. 19, 1966. This application May 1, 1969, Ser. No. 821,071
Int. Cl. C07c *43/12;* C07d *7/14*
U.S. Cl. 260—345.1                                23 Claims

ABSTRACT OF THE DISCLOSURE

A process of preparing cyclic or acyclic ethers by reacting certain 1-olefins with formaldehyde and a halogenating agent selected from hydrogen halides, thionyl halides, and carbonyl halides. When the reaction is conducted at a temperature of —40° C. or lower and at a pressure of at least 100 pounds per square inch, novel 1-methylalkoxy-3-haloalkoxymethanes are formed in addition to the cyclic or acyclic ether. 4-chloro-3-heptyltetrahydropyran, a cyclic ether produced by the process of this invention, can be used as a plasticizer in poly(vinyl chloride).

---

This application is a continuation-in-part of patent application Ser. No. 682,970, filed Nov. 14, 1967, now abandoned, which is a continuation-in-part of patent application Ser. No. 602,553, filed Dec. 19, 1966, now abandoned.

This invention relates to a process of preparing cyclic or acyclic ethers. In another aspect, this invention relates to an improved process for preparing 3-haloalkyl halomethyl ethers, 4-halotetrahydropyrans and 3-alkyl-4-halotetrahydropyrans. In still another aspect, this invention relates to a process for preparing 1-methylalkoxy-3-haloalkoxymethanes which are novel compositions of matter.

It is known that 4-halotetrahydropyrans can be produced by the chloromethylation of β-ethylenically unsaturated alcohols. Such process is disclosed in Chemical Abstracts 51, 1156 (1957). This typical prior art synthesis method is generally undesirable for commercial application because of the expensive reactants which are utilized.

One object of this invention is to provide an improved process for making cyclic or acyclic ethers.

Another object of this invention is to provide an improved process for making 3-haloalkyl halomethyl ethers, 4-halotetrahydropyrans and 3-alkyl-4-halotetrahydropyrans.

Another object of this invention is to provide novel 1-methylalkoxy-3-haloalkoxymethanes.

According to the invention, 1-olefins having the general formula R—CH$_2$—CH=CH$_2$, wherein R is hydrogen or a branched or unbranched, cyclic or acyclic paraffinic radical (e.g., alkyl) having up to and including 17 carbon atoms, are reacted with formaldehyde and a halogenating agent selected from hydrogen halides, thionyl halides, and carbonyl halides to produce a 3-haloalkyl halomethyl ether having the general formula

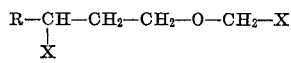

or a cyclic ether having the general formula:

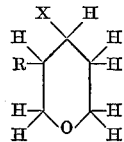

where R is defined as above and X is a halogen. The reaction can be carried out at a temperature within the range of —150° C. to 250° C., and under any convenient pressure either above or below atmospheric.

Other products of this reaction are synmmetrical and unsymmetrical formals, which can comprise from about 5 to about 30 percent of the product yield based upon the amount of formaldehyde entering the reaction. When the reaction is carried out under lower pressures (below 100 p.s.i.g.), one of the products of the reaction is a symmetrical formal having the general formula:

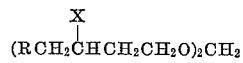

wherein R and X are as defined above. When the reaction is conducted at a temperature of —40° C. or less and at a pressure of 100 p.s.i.g. or greater, one product is unsymmetrical formal having the general formula:

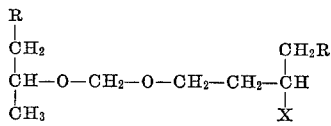

wherein R and X are as defined above. These unsymmetrical formals are believed to be novel composiitons of matter.

Examples of suitable olefins that can be used in the process of this invention include: propylene, 1-butene, 1-hexene, 7-cyclohexyl-1-heptane, 1-pentene, 4-methyl-1-pentene, 1-octene, 4-ethyl-1-hexene, 3-cyclododecyl-1-propene, 8-cyclohexyl-1-tetradecene, 1-dodecene, 1-eicosene, 5,5-dimethyl-1-decene, mixtures thereof, and the like. The hydrogen halides HCl, HBr, HI, and HF can all be utilized in this process. Likewise, the thionyl halides and carbonyl halides SOCl$_2$, SOBr$_2$, SOF$_2$, COCl$_2$, COBr$_2$, and COF$_2$, can all be utilized in this process. The chloride derivatives of the halogenating agents are generally preferred because of their ready availability.

The molar ratio of formaldehyde (CH$_2$O) to the olefin can be within the range of 0.2:1 to 5:1, respectively. It is preferred that quantities of olefin in excess of 1 mole of olefin per 2 moles formaldehyde be used to assure complete reaction of the formaldehyde, i.e., 2 moles of olefin per mole of formaldehyde.

When a hydrogen halide is used as the halogenating agent, it is generally desirable to use about ½ mole hydrogen halide per mole of formaldehyde. However, it is frequently preferred to employ an excess of hydrogen halides such as by passing the hydrogen halide at a generally uniform rate through the reaction mixture during the reaction. When a thionyl halide or a carbonyl halide is used as the halogenating agent, it is generally employed in the range of about 0.05 to about 5 moles per mole of formaldehyde. Preferably, the thionyl halide or carbonyl halide is employed in the range of about 0.25 to about 1 mole per mole of formaldehyde, and more preferably, about 0.4 to 0.6 mole per mole of formaldehyde. When using a thionyl halide or a carbonyl halide as the halogenating agent, it is generally desirable to initiate the reaction with the hydrogen halide. This is done, for example, by passing the hydrogen halide to the reaction zone containing the three reactants for a short period of time, e.g. 1–5 minutes.

It is generally preferred that the reactants be contacted in the absence of water other than that produced in the reaction. Therefore, it is generally preferred that the formaldehyde be in the form of paraformaldehyde (CH$_2$O)$_x$, and the other reactants be in anhydrous form. If desired, the reaction can be carried out in the presence or absence of diluent that is substantially completely nonreactive to the reaction environment. Suitable diluents include ethers, saturated hydrocarbons, aromatic hydrocarbons, chlorinated hydrocarbons, and the like. Examples of some diluents that can be used are diethyl ether, methyl ethyl ether, hexane, benzene, toluene, methylene chloride, chloroform, carbon tetrachloride, and the like and mixtures thereof.

However, as will be described below, it is possible to obtain good yields when this reaction is conducted in the presence of reaction mediums that are substantially polar such as aqueous mediums in the presence or absence of an ionizing halide compound. In this case, the formaldehyde can be employed in the form of formalin. In the absence of an ionizing compound, the conversion of the reactants to 3-haloalkyl halomethyl ether is promoted.

In a presently preferred embodiment of this invention, the halide ion concentration in the liquid reaction environment is increased by adding a substantially soluble ionizing halide compound to the reaction medium to promote the conversion of the reactants to 4-halotetrahydropyrans. The particular ionizing halide compounds to be added to the reaction medium will depend upon the particular reaction medium employed. Any ionizible halide can be employed that is substantially soluble in the reaction medium and that is substantially ionized to a cation and a halide ion in the liquid reaction medium. These ionizing halide compounds can be employed in the range of about 0.1 to about 100 parts by weight for each 100 parts by weight of 1-olefin employed.

For reaction mediums of less polar nature wherein diluents such as those heretofore names are employed, ionizible halogen containing compounds of a less polar nature can be employed. In this instance, the preferred ionizing halide compounds are materials of substantially organic nature which have a halogen-nitrogen ionic bond. Examples of these compounds include: tetramethylammonium chloride, tetramethylammonium bromide, tetramethylammonium fluoride, piperidinium hydrochloride, piperidinium hydrobromide, piperidinium hydrofluoride, piperidinum hydrochloride, piperazinium hydrochloride, quinolinium hydrochloride, 2,4-lutidinium hydrochloride, 2,3,5-collidinium bromide, 3-picolinium chloride isoquinolinium chloride, quaternary ammonium halides of various types, and the like.

For reaction mediums that are substantially polar such as aqueous mediums, compounds such as metal halides can be employed. Preferably, the halide salts of Group IA or Group IIA metals [Handbook of Chemistry and Physics, Chemical Rubber Co., 45 ed. (1964) (p. B–2)] are employed. Examples of these salts include sodium chloride, potassium chloride, lithium chloride, sodium bromide, potassium bromide, lithium bromide, sodium fluoride, potassium fluoride, cesium fluoride, rubidium fluoride, magnesium bromide, strontium chloride, and the like. When using an aqueous system wherein formaldehyde can be employed in the form of formalin, other suitable diluents that are non-reactive with the water and the other reactants present can also be employed, if desired, such as dioxane, tetrahydrofuran, tetrahydropyran, dimethyl sulfoxide, diethylsulfoxide, pyridine, quinoline, piperidine, sulfolane, and the like. It is generally preferred to use these ionizing halide compounds whenever an aqueous reaction system is utilized if a cyclic ether product is desired.

As stated above, the contact of the three reagents can be carried out at a temperature within the broad temperature range of from $-150°$ C. to $250°$ C. Preferably, the reaction can be carried out from $-70°$ C. to $70°$ C. If a nonaqueous system is used, it is preferred that the process be carried out in a manner such that the liquid water formed in the reaction is removed as rapidly as possible. In this instance, the most preferred temperature range is from $-70°$ C. to $0°$ C. at 1 atmosphere pressure. It is readily seen that under these conditions, water formed as a by-production in the reaction is frozen as it is formed. In the case where an aqueous medium is employed, it is preferred that the temperature be in the range of about $0°$ C. to about $100°$ C. The process can be carried out under any convenient pressure either above or below atmospheric; however, it is preferred to use a pressure which is sufficient to maintain the reaction mixture substantially in the liquid phase. The reaction is rapid, and the reaction time will be in the range of from 1 minute to 10 hours depending upon reaction conditions, the contacting techniques used, and the desired degree of conversion.

The process can be carried out either batchwise or continuously. In the batch process, the hydrogen halide can be passed into a reaction zone containing formaldehyde and 1-olefin; or the formaldehyde, 1-olefin and thionyl halide or carbonyl halide are contacted in the reaction zone; or combinations can be used. In continuous operations, the essential reactants can be brought together simultaneously for a sufficient time to result in the desired degree of conversion before the subsequent isolation and recovery steps. It is sometimes desirable to carry out the process in the presence of an inert gas such as nitrogen or helium and in the absence of oxygen.

Also, if desired, the reaction can be promoted by the presence of a Lewis acid catalyst, such as $SnCl_4$, $ZnCl_2$, $BF_3$, and the like in the reaction mixtures in catalytic amounts. Similarly, minor amounts of dehydrating agents such as $MgSO_4$, $Na_2SO_4$, $P_2O_5$, $PCl_3$, and the like can also be present in the reaction zone when nonaqueous systems are employed. However, as will be illustrated in the examples below, the presence of such catalytic promoter or dehydrating agent is not essential and satisfactory operation of the process of this invention can be had without its use.

The product can be recovered and isolated by any method known in the art. It is generally desirable to remove the excess hydrogen halide from the reaction mixture by water-washing or by washing the reaction mixture with an aqueous solution of sodium bicarbonate, or by purging the reaction zone with a gas that is non-reactive with the materials contacted by the gas. The resulting reaction mixture can then be distilled or separated by any suitable means.

When propylene is used as the 1-olefin reagent in the process, the major reaction product will be a 3-halobutyl halomethyl ether or a 4-halotetrahydropyran, the latter being the product when an ionizing halide compound is employed. When using 1-olefins higher than propylene a 3-haloalkyl halomethyl ether or a 3-alkyl-4-halotetrahydropyran will result. It is possible to utilize a mixture of 1-olefins to yield a mixture of reaction products.

This invention is further illustrated by the following examples.

EXAMPLE I

Preparation of 4-chlorotetrahydropyran

A reactor equipped with stirrer, low temperature thermometer, condenser, and gas dispersion tube, was charged with 720 parts by weight of paraformaldehyde and 2672 parts by weight of methylene chloride. This mixture was cooled to $-65°$ C. under a nitrogen atmosphere and 630 parts by weight of propylene was added to the mixture through the dispersion tube while stirring. HCl was then passed into the reaction mixture for 4½ hours at $-60°$ C. to $65°$ C. The reaction mixture was allowed to warm to room temperature, and was then washed successively with water and with 5 percent aqueous sodium bicarbonate solution until neutral. The organic layer was dried with magnesium sulfate and the methylene chloride diluent was removed by distillation. The remaining material, about 1165.1 parts by weight, was fractionated yielding 4-chlorotetrahydropyan and bis (3-chlorobutoxy)methane in 45 mole percent and 15 mole percent yield, respectively, based on the paraformaldehyde.

EXAMPLE II

Preparation of 3-methyl-4-chlorotetrahydropyran

Using the same general procedure as that described in Example I, 540 by weight of paraformaldehyde, 2000 parts by weight of methylene chloride, and 672 parts by weight of 1-butene were cooled to −65° C. Hydrogen chloride was passed into the stirred reaction mixture for 4½ hours after which the reaction mixture was allowed to warm to room temperature.

The reaction mixture was washed with water and 5 percent sodium bicarbonate solution until neutral. The methylene chloride was removed by distillation leaving about 820.4 parts by weight of crude product. Fractionation yielded 3-methyl - 4 - chlorotetrahydropyran in about 70 mole percent yield based on the formaldehyde.

EXAMPLE III

Preparation of 3-heptyl-4-chlorotetrahydropyran

Using the same general procedure that was described in Example I, a reactor was charged with 234 parts by weight of 1-decene, 75 parts by weight of paraformaldehyde, and 668 parts by weight of methylene chloride. Dry hydrogen chloride was passed into this stirred mixture for 2.5 hours at about −65° C. yielding, after product recovery, 195.8 parts by weight (71.8 mole percent) yield of 3-heptyl - 4 - chlorotetrahydropyran. Elemental analysis showed the following:

| Element: | Calculated for $C_{12}H_{23}OCl$, percent | Found, percent |
|---|---|---|
| C | 65.9 | 65.5 |
| H | 10.6 | 10.7 |

EXAMPLE IV

Preparation of 3-nonyl-4-chlorotetrahydropyran

Using the same general technique as that of Example III, 280 parts by weight of 1-dodecene, 75 parts by weight of paraformaldehyde, and 668 parts by weight of methylene chloride were treated with hydrogen chloride for 2.5 hours at about −65° C. After washing and removal of the solvent, 332.4 parts by weight of crude product were obtained which yielded about 238 parts by weight of 3-nonyl-4-chlorotetrahydropyran (77 percent per pass yield based on formaldehyde charged) on fractionation.

The product was subjected to elemental analysis with the following results:

| Element: | Calculated for $C_{14}HO_{27}Cl$, percent | Found, percent |
|---|---|---|
| C | 68.1 | 62.2 |
| H | 10.95 | 11.1 |
| Cl | 14.4 | 14.4 |

EXAMPLE V

Preparation of 3-amyl-4-chlorotetrahydropyran

Using the same general technique as that described in Example IV, 289 parts by weight of 1-octene and 84 parts by weight of paraformaldehyde were cooled in an ice bath and treated with dry HCl for 3 hours. After this, 17 parts by weight of stannic chloride was added and the treatment with HCl was continued for 9 hours more. A total of 65.9 parts by weight of 3-amyl-4-chlorotetrahydropyran was recovered using the washing and fractionation techniques described previously. A portion of the product boiling at about 77° C. at 1.5 mm. Hg was subjected to elemental analysis with the following results:

| Element: | Calculated for $C_{10}HO_{19}Cl$, percent | Found, percent |
|---|---|---|
| C | 63.0 | 63.2 |
| H | 10.0 | 10.0 |
| Cl | 18.6 | 18.9 |
| Molecular weight | 190.5 | 180 |

Examples I–V illustrate the process of this invention for producing various 4-halotetrahydropyrans wherein paraformaldehyde, a 1-olefin, and an anhydrous hydrogen halide are reacted in an inert diluent system or in the absence of diluent.

EXAMPLE VI

The following run was made with the 4-chloro-3-heptyltetrahydropyran derived from the run of Example III to illustrate the use of the product of this invention as a plasticizer in poly(vinyl chloride). The 4-halotetrahydropyran product was incorporated into the polyvinyl chloride and the resins, as indicated below, were made. As shown, the 4-halotetrahydropyran effectively plasticized the poly(vinyl chloride).

Formulation:
  Poly(vinyl chloride)[1]—100 phr.
  3-heptyl-4-chlorotetrahydropyran—50 phr.
  Stabilizer[2]—2 phr.
  Stearic acid[3]—1 phr.

Physical tests:
  Durometer, 10 sec.—82 ASTM D–1706
  Tensile break, p.s.i.—2860 ASTM D–412
  Elongation break, percent—346 ASTM D–412
  100% modulus, p.s.i.—1628 ASTM D–412
  Brittleness temp. ° F.—54 ASTM D–746
  Clash-Berg, ° F.—39 ASTM D–1043
  Carbon volatility, percent—10.85 ASTM D–1203

[1] ASTM D 1755–60T—Classification GP–6–15443.
[2] A commercial organotin heat stabilizer.
[3] Lubricant.

Example VII illustrates the use thionyl halide as the halogenating agent in the process of this invention. Example VIII is a control run effected under the basic conditions of Example VII except using HCl as the sole halogenating agent. A comparison of Example VII with Example VIII demonstrates that the use of the thionyl halide results in a substantially increased yield of the 4-halotetrahydropyran product.

EXAMPLE VII

A stirred reactor was charged with 84 parts by weight of 1-hexene, 65 parts by weight of paraformaldehyde, and 267 parts by weight of methylene chloride. Upon cooling to 5° C., 119 parts by weight of thionyl chloride was added. Anhydrous HCl was passed to the reactor for one minute to initiate the reaction, and stopped. A vigorous nonexothermic reaction evidenced by gas evolution (SO₂) was then noted and allowed to proceed unhindered until gas evolution ceased (within 3 hours).

Volatiles were then stripped at reduced pressure, and the residue was fractionally distilled at reduced pressure. A yield of 73 mole percent of 3-propyl-4-chlorotetrahydropyran based on the paraformaldehyde starting material was recovered.

EXAMPLE VIII

A stirred reactor was charged with 168 parts by weight of 1-hexene, 90 parts by weight of paraformaldehyde, and 267 parts by weight of methylene chloride. Anhydrous HCl was passed to the reactor for 2.25 hours, and the reaction was effected at 5° C. The product was recovered, and the yield of the 3-propyl-4-chlorotetrahydropyran product was 18.5 mole percent based on the paraformaldehyde charged.

Examples IX through XIII illustrate the use of the ionizing halide compounds in the reaction mixture.

EXAMPLE IX

A stirred reactor was charged with 42.5 parts by weight of piperidine and 267 parts by weight of methylene chloride. The mixture was cooled to about 5° C., and anhydrous hydrogen chloride was added to form piperidinium hydrochloride. Next, 42 parts by weight of 1-hexene was added concurrently with 15 parts by weight of paraformaldehyde and an additional 33.4 parts by weight of methylene chloride. Anhydrous hydrogen chloride was then passed into this reaction mixture for 40 minutes. A total of 24 parts by weight of 3-propyl-4-chlorotetrahydropyran was recovered for a yield of 59 mole percent based on the formaldehyde charged. A portion of the product boiling at about 84–85° C., 8 mm. Hg was subjected to elemental analysis with the following results:

| Element: | Calculated for 3-propyl-4-chlorotetrahydropyran, percent | Found, percent |
|---|---|---|
| C | 59.1 | 58.9 |
| H | 9.2 | 9.0 |
| Cl | 21.9 | 22.0 |

EXAMPLE X

A stirred reactor was charged with 168 parts by weight of 1-hexene, 65.6 parts by weight of paraformaldehyde, 110 parts by weight of tetramethylammonium chloride, and 375 parts by weight of chloroform. The reactor contents were cooled to about 5° C., and anhydrous hydrogen chloride was passed in for 2.25 hours, and the temperature was held at about 5° C. A total of 91.3 parts by weight of product identified to be principally 3-propyl-4-chlorotetrahydropyran (B.P. 90–140° C., 18 mm. Hg) was recovered. Gas-liquid chromatographic analysis of the product determined that a 50 mole percent overall yield of 3-propyl-4-chlorotetrahydropyran was obtained based on the paraformaldehyde charged.

Examples IX and X, as compared with Example VIII demonstrate that a great increase in yield (almost threefold) of 4-halotetrahydropyran product is effected by increasing the halide ion concentration of the reaction medium of nonaqueous systems according to the process of this invention. Two further control runs are illustrated in Example XI below, and demonstrate that the use of the ionizing halide compounds in Examples IX and X, piperidinium hydrochloride and tetramethylammonium chloride, respectively, result in higher product yields at higher more convenient temperatures.

EXAMPLE XI

Two further control runs, identical with the run of Example VIII except that temperatures of $-30°$ C. and $-65°$ C. were employed for the addition of the anhydrous HCl. A yield of 128 parts by weight (57 mole percent) was obtained with the run of $-30°$ C., and a yield of 203 parts by weight (90.5 mole percent) was obtained with the run at $-65°$ C. A comparison of these runs with the runs of Examples IX, X and VIII, clearly illustrates that the ionizing halide compounds which were added to the reaction mixture in Examples IX and X result in a higher product yield at a higher temperature. The temperature of 5° C. (approximate ice bath temperature), was chosen, because of convenience for the comparative runs to demonstrate the improvement of the instant invention. Such comparative runs at 5° C. are for exemplary purposes to demonstrate the improvement of the instant invention, only, and should not be construed as limiting as to temperature, or in any other manner.

Examples XII and XIII illustrate the use of an ionizing halide compound added to an aqueous reaction mixture of the present invention.

EXAMPLE XII

A stirred reactor was charged with 85 parts by weight of formalin (containing 31.4 parts by weight of formaldehyde and the rest water), 84 parts by weight of 1-hexene, 480 parts by weight of dioxene, and 200 parts by weight of lithium chloride. The mixture was cooled, and HCl was passed to the mixture for 3 hours at 10–15° C. The reactor contents were then poured into cold water and this was extracted with methylene chloride. The extract was washed with sodium carbonate solution and dried over magnesium sulfate.

Volatiles were stripped from the extract, and the residue was distilled at reduced pressure to effect a 49 mole percent yield of 3-propyl-4-chlorotetrahydropyran based on the formaldehyde charged.

EXAMPLE XIII

A run similar to that of Example XII was effected except that no lithium chloride was employed and that the temperature rose 65° C. when the HCl was passed into the mixture. The product was recovered as described in Example XII, to effect a 21 mole percent yield of 3-propyl-4-chlorotetrahydropyran based on the formaldehyde charged.

A comparison of Examples XII and XIII demonstrates that increasing the halide ion concentration of an aqueous reaction medium according to the process of this invention greatly improves the yield of 4-halotetrahydropyran product (over twofold).

Example XIV illustrates the synthesis of 1-methylalkoxy-3-haloalkoxymethanes according to the process of this invention.

EXAMPLE XIV

A stirred reactor was charged with 166 parts by weight of paraformaldehyde and 200 parts by weight of methylene chloride. This mixture was cooled to about $-65°$ C. under a nitrogen atmosphere. One hundred sixty-eight parts by weight of propylene was added to the mixture. Anhydrous HCl was then passed into the mixture for two hours at 300 p.s.i.g. pressure, and the reaction mixture was maintained at about $-65°$ C. The reaction product was worked up by the technique described in Example I above, and fractionated to yield about 74 parts by weight of 1-methylethoxy-3-chlorobutoxymethane. The remainder of the reaction product was determined to be largely 4-chlorotetrahydropyran and bis(3-chlorobutoxy)methane by gas liquid chromatography but was not fractionated. A fraction containing the bulk of 1-methylethoxy-3-chlorobutoxymethane (B.P. 78–85° C., 0.8 mm. Hg) was subjected to analysis with the following results:

Gas chromatography demonstrated the fraction to be more than 90 mole percent of one compound, and the structure of that compound was determined. That compound was shown to be 1-methylethoxy-3-chlorobutoxymethane, $C_8H_{17}O_2Cl$, molecular weight 180, with the structure:

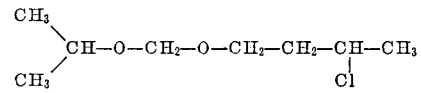

Data follow:

ELEMENTAL ANALYSIS

| Element: | Weight percent | Calculated number in molecule |
|---|---|---|
| C | 52.2 | 8.0 |
| H | 9.1 | 16.75 |
| Cl | 19.0 | 1.00 |
| O | 19.7 | 2.27 |

These values, which were determined on the fraction, indicate the major compound of the fraction to be $C_8H_{17}O_2Cl$. Infrared spectrum (2.15–15 microns).

Strong absorption in the region of 1000 to 1200 cm.$^{-1}$ is consistent with the —C—O—CH$_2$—C— structure. No significant amount of OH near 3500 cm.$^{-1}$ or C=O near 1700 cm.$^{-1}$ is indicated. Prominent absorption bands near 1375 and 1450 cm.$^{-1}$ are probably associated with methyl and methylene, respectively. Absorption bands near 650 cm.$^{-1}$ and 790 cm.$^{-1}$ are consistent with chloring substitution and show good agreement with 2-chlorobutane in this region. The conclusion is evident that the spectrum is consistent with the indicated structure.

A mass spectrum was consistent with the indicated structure.

A NMR spectrum was consistent with the indicated structure, as is shown below:

$$\overset{(a)}{H_3C}\diagdown\overset{(c)}{\underset{H_3C}{\underset{(g)}{|}}{C}}-O-\overset{(a)}{CH_2}-O-\overset{(d)}{CH_2}-\overset{(e)}{CH_2}-\overset{(b)}{\underset{Cl}{\overset{H}{|}}{C}}-\overset{(f)}{CH_3}$$

| Tau values | Proton assignments | Multiplicity | Number of protons experimentally | Number of protons calculated |
|---|---|---|---|---|
| 5.4 | —O—CH$_2$—O—(a) | Singlet | 1.9 | 2 |
| 5.83 | —CHCL—(b) | Multiplet | --- | 1 |
| 6.2 | >CH—O—(c) | ...do... | --- | 1 |
| 6.38 | O—CH$_2$—(d) | Triplet | 4.1 | 2 |
| 8.1 | O—C—CH$_2$—C—Cl(e) | Quartet | 2.1 | 2 |
| 8.5 | CH$_3$—CH—Cl(f) | Doublet | ¹ 3.2 | 6 |
| 8.85 | —O—C(CH$_3$)(CH$_3$) (g) | ...do... | 5.7 | 6 |

¹ Overlap.

The unsymmetrical formals produced by the process as illustrated in Example XIV may be used as fungicides and insecticides for aphids.

EXAMPLE XV

A stirred reactor was charged with 1.5 liters of 36.6% aqueous formalin and 300 ml. of concentrated CHl. Maintaining the reactor at about 1° C., hydrogen chloride and propene were simultaneously passed through the reactor for 8 hours. The reaction mixture was extracted with methylene chloride. The methylene chloride extract was washed with water and dried with CaCl$_2$. The methylene chloride was then stripped, and 199.5 g. of 3-chlorobutyl chloromethyl ether was isolated by fractional distillation, B.P. 96–100° C., 22 mm. Hg. A heart cut having a B.P. of 100° C., 22 mm. Hg, was found to have the following elemental composition: Theory (percent): C, 38.3; H, 6.4; Cl, 43.3. Found (percent): C, 38.1; H, 6.6; Cl, 45.5.

Theoretical molecular weight for 3-chlorobutyl chloromethyl ether is 157; molecular weight found is 156.27. NMR (nuclear magnetic resonance) indicated the material to be 3-chlorobutyl chloromethyl ether.

Example XV illustrates the process of this invention for the production of a 3-haloalkyl halomethyl ether.

I claim:
1. A process for producing cyclic ether having the formula

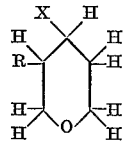

or acyclic ethers having the formula

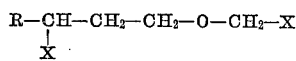

comprising contacting a 1-olefin having the formula $$R—CH_2—CH=CH_2$$

wherein R is hydrogen, or an alkyl radical having up to and including 17 carbon atoms and X is a halogen, with formaldehyde and a halogenating agent selected from hydrogen halides, carbonyl halides, and sulfonyl halides, at a temperature within the range of −150° C. to 250° C.

2. The process of claim 1 wherein said formaldehyde is in the form of paraformaldehyde and said halogenating agent is anhydrous hydrogen halide.

3. The process of claim 2 wherein said temperature is a temperature wtihin the range of −70° C. to 0° C.

4. The process of claim 3 wherein said 1-olefin is propylene, and said cyclic ether is 4-halotetrahydropyran.

5. The process of claim 4 wherein said hydrogen halide is hydrogen chloride and said cyclic ether is 4-chlorotetrahydropyran.

6. The process of claim 3 wherein said 1-olefin has at least 4 carbon atoms and said cyclic ether is a 3-alkyl-4-halotetrahydropyran.

7. The process of claim 6 wherein said hydrogen halide is hydrogen chloride.

8. The process of claim 7 wherein said 1-olefin is 1-butene and said cyclic ether is 3-methyl-4-chlorotetrahydropyran.

9. The process of claim 7 wherein said 1-olefin is 1-hexene and said cyclic ether is 3-propyl-4-chlorotetrahydropyran.

10. The process of claim 7 wherein said 1-olefin is 1-octene and said cyclic ether is 3-amyl-4-chlorotetrahydropyran.

11. The process of claim 7 wherein said 1-olefin is 1-decene and said cyclic ether is 3-heptyl-4-chlorotetrahydropyran.

12. The process of claim 7 wherein said 1-olefin is 1-dodecene and said cyclic ether is 3-nonyl-4-chlorotetrahydropyran.

13. The process of claim 1 wherein said contacting occurs in the presence of an inert diluent which is substantially completely non-reactive to the reaction environment.

14. The process of claim 13 wherein said reaction occurs in the presence of an organic compound containing at least one halogen-nitrogen ionic bond.

15. The process of claim 1 wherein said halogenating agent is a thionyl halide.

16. The process of claim 1 wherein said formaldehyde is in the form of formalin.

17. The process of claim 16 wherein said contacting occurs in the presence of the halide salt of Group IA or IIA metals of the Periodic Table.

18. The process of claim 1 wherein said temperature is −40° C. or lower and wherein said contacting occurs at a pressure of 100 p.s.i.g. or greater.

19. The process of claim 16 wherein said ether is 3-haloalkyl halomethyl ether.

20. The process of claim 19 wherein said halogenating agent is hydrogen halide.

21. The process of claim 19 wherein said 1-olefin is propylene.

22. The process of claim 19 wherein said hydrogen halide is hydrogen chloride.

23. The process of claim 19 wherein said ether is 3-chlorobutyl chloromethyl ether.

References Cited

UNITED STATES PATENTS 3,030,384  4/1962  Somerville _____ 260—345.1
3,414,588  12/1968  Jones _____ 260—345.1X JOHN M. FORD, Primary Examiner U.S. Cl. X.R.

260—614, 615, 30.4, 999, 611